Feb. 8, 1949.  T. E. MEAD  2,461,292
WORK HOLDER
Filed June 18, 1945
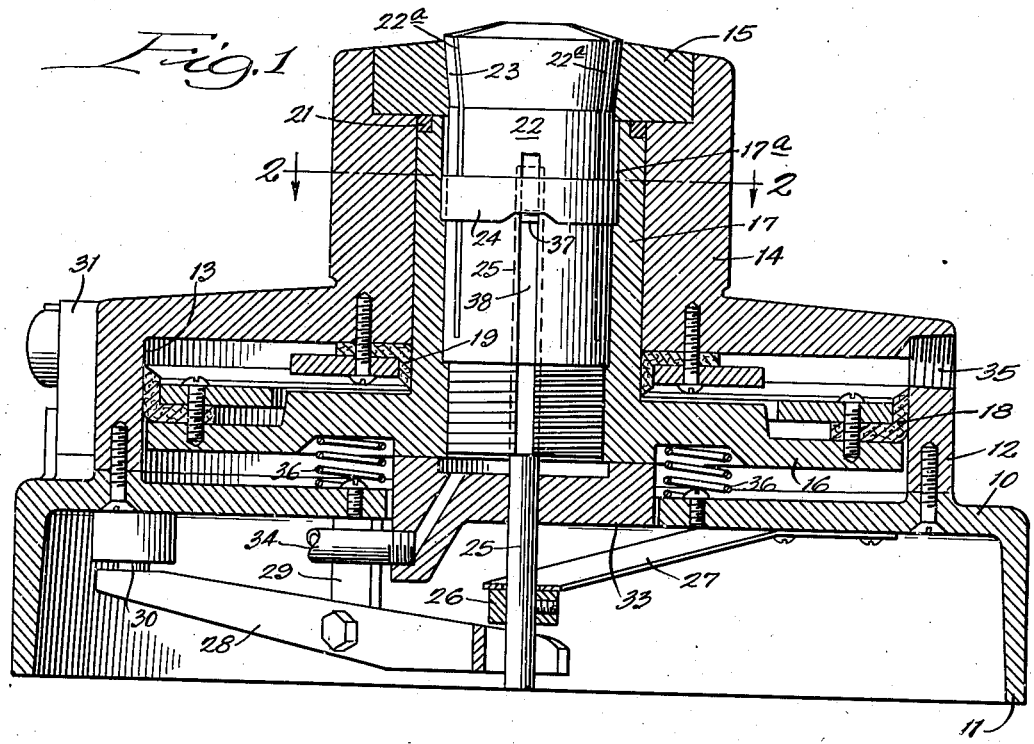
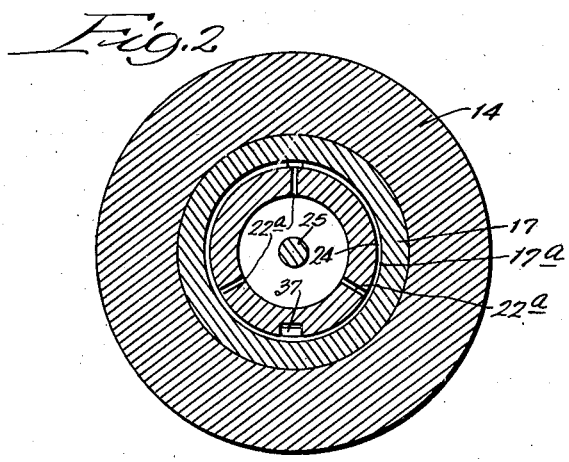
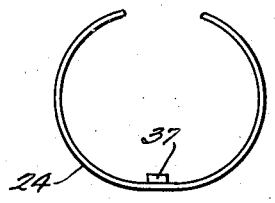
Inventor:
Theodore E. Mead,
By Dawson, Ooms & Booth
Attorneys.

Patented Feb. 8, 1949

2,461,292

UNITED STATES PATENT OFFICE 2,461,292

WORK HOLDER

Theodore E. Mead, Wilmette, Ill., assignor to Mead Specialties Company, Inc., a corporation of Illinois Application June 18, 1945, Serial No. 600,156

4 Claims. (Cl. 279—4)

This invention relates to a work holder, and more particularly to power driven apparatus for holding a work-piece during a machining operation.

An object of the invention is to provide a work holder in which the parts are adjustable for varying the extent of the stroke in applying the desired pressure while at the same time permitting the removal of the collet and the substitution of a new collet therefor. A further object is to provide friction means whereby the collet may be adjusted manually to the desired point and which will prevent the collet from turning after it has been adjusted to suit the work in hand. Other specific objects and advantages will appear as the specification proceeds.

The invention is illustrated in a preferred embodiment, by the accompanying drawing, in which—

Figure 1 is a vertical sectional view of apparatus embodying my invention; Fig. 2, a transverse sectional view; and Fig. 3, a top plan view of a friction spring employed.

The work holder preferably comprises a base 10 having a depending flange portion 11 which rests upon a work table. The base may be secured to the work table, if desired, by any suitable means, such as screws or the like, passing through the base and into the table. Above the base a main body is mounted, including an enlarged cylindrical portion 12 formed with a cylindrical bore 13 and having a tubular extension 14 of reduced diameter extending upwardly therefrom. The extension 14 carries at its upper end a clamping ring 15 having a conical central bore therein.

Within the bore 13 there is slidably mounted a piston 16 which is formed with a tubular neck 17 fitting slidably in the extension 14. The piston carries a packing 18 working against the inner surface of the bore 13. A similar packing 19 is connected to the body 12 to seal around the neck 17 of the piston. Preferably, an oil ring or like packing 21 is provided on the neck 17 to prevent leakage of oil around the neck into the bore.

A collet or clamping member 22 is secured in the neck and is formed with a plurality of jaws having conical outer surfaces indicated at 23 to cooperate with the clamping ring 15. The clamping jaws are provided by forming slots 22a in the hollow metal piece comprising the clamping member 22. The clamping member is screw-threaded to the piston at the lower end of the neck and is adapted to be raised by rotation of the collet. The collet is hollow and is adapted to receive a work-piece at its upper end which will be securely clamped in position when the collet is moved down into the ring 15. A spring ring 24, having a lug 37 bent inward to engage the keyway 38 of the collet 22, presses outward against the wall 17a of the neck 17, the friction thus caused preventing the collet from turning after it has been adjusted to suit the work in hand. The neck 17 is preferably enlarged at 17a, as shown more clearly in Fig. 1, to receive the spring 24.

In order to limit movement of a work-piece into the clamping member, a stop rod 25 is provided which extends loosely into the clamping member and is adapted to rest at its lower end on the work table. The stop rod may be of any desired length to permit movement of a work-piece into the clamping member to the desired distance so that the vertical position of the work-piece in the holder will be accurately determined.

The stop rod may also be utilized, according to the invention, to eject a completed work-piece from the clamping member. For this purpose, a collar 26 is fixed on the stop rod and is engaged by one end of a leaf spring 27 which is rigidly attached to the under surface of the base at its opposite end. The spring yieldingly holds the stop rod down against the work table and permits it to be moved up for ejecting the work-piece from the clamping member.

The rod is moved up by a lever 28 pivoted intermediate its ends on a bracket 29 in the base and having a forked end straddling the stop rod below the collar 26. The opposite end of the lever 28 is engaged by the end of a piston rod 30 working on a cylinder 31, as shown more clearly in my co-pending application Serial No. 517,640, filed January 10, 1944, for Work holder, now Patent No. 2,428,496. Fluid pressure may be supplied to the cylinder 31 through suitable connections with a source of pressure.

The clamping member and a work-piece carried thereby may be kept clean and may be lubricated by providing a constant flow of lubricant through the clamping member around the work-piece during operation. For this purpose, the lower end of the neck 17 is closed by a cover 33 which is rigidly attached to the piston and which extends loosely through a central opening in the top of the base. Fluid, such as a lubricant, can be supplied through a conduit 34. Such fluid will flow upwardly through the clamping member around the work-piece therein to cool and lubricate the parts and to flush any chips therefrom.

Fluid pressure is admitted to the bore 13 above the piston 16 through a connection 35. Springs 36 are mounted upon base 10 below the piston 16 and serve to return the piston to its upper position upon the release of pressure.

In the adjustment of the collet 22 by rotating the collet within the neck 17, it is extremely important that the collet be held firmly in place after an accurate adjustment has been made. The friction spring 24, which lies within the enlarged bore 17a, maintains the collet in such firm position. The spring is preferably locked to the collet 22 by bringing an inwardly-struck key 37 within a longitudinal groove 38 with which the collet is provided.

In the operation of the device, a work-piece is inserted in the collet or clamping member 22 and fluid is supplied to the space above the piston 16 through the connection 35. This forces the piston down so as to clamp the jaws of the clamping member inwardly into engagement with the work-piece to hold it securely in place during a machining operation. On completion of the operation, when the pressure supplied to the bore is relieved, the springs 36 raise the piston 16 to its initial position. Pressure may then be supplied to the cylinder 31 to raise the stop rod 25 and thereby eject the completed work-piece from the holder. The collet 22 may be elevated to the desired position with respect to the other structure by rotating it within the threaded neck 17. This may be done manually or by any suitable tool which engages the collet 22. When the collet has been raised to the desired elevation, it will remain firmly in the adjusted position because of the friction spring 24. Since the key 37 of the spring 24 is securely locked to the groove 38 of the collet, the collet will not turn from its adjusted position without requiring the turning of the spring 24. The drag effect of the spring is sufficiently great to prevent such turning movement unless the turning is deliberate.

It will be seen that any collet 22 may be unscrewed and removed from the fixture, and another collet inserted, without disturbing any other parts of the fixture, and without the use of tools. As soon as the threads at the bottom of the collet 22 have been unscrewed from the threads in the piston, the collet may be lifted out, leaving the spring 24 in place, ready to receive and provide torque-resisting friction for the next collet to be inserted.

Moreover, an infinitely fine adjustment of the collet is possible, resulting in a minimum length of stroke for the piston 16, thus reducing wear on moving parts and preventing waste of pressure fluid. Furthermore, this fine adjustment makes it possible to keep the leaves or jaws of the collet in contact with the tapered walls of the ring 15 at all times, preventing chips from getting between the bearing surfaces. When properly adjusted, a vertical movement of only a few thousandths of an inch is necessary for the collet to hold or to release the work-piece.

While in the foregoing specification, I have set forth certain specific structures as illustrative of the invention, it will be understood that wide variation may be made in such structure for accomplishing the same result without departing from the spirit of my invention.

I claim:

1. In a work holder, a casing providing a piston chamber and a tubular bore aligned therewith, a piston in said chamber and equipped with a tubular member received within said tubular bore, a hollow clamping member in said tubular piston member and adjustably connected thereto, means for admitting fluid to said chamber to move said piston in one direction, means associated with said casing for causing the clamping member to grip a work-piece received therein when said piston is moved in said direction by said fluid, at least one of said members being equipped with a longitudinal key slot, and a spring member equipped with a key engaging said slot and having arms engaging the member to which said spring is not attached by said key.

2. In a work holder, a casing providing a piston chamber and a tubular bore aligned therewith, a piston in said chamber and equipped with an upwardly-extending tubular member extending into said tubular bore, a hollow clamping member in said bore threadedly connected to said piston for longitudinal adjustment with respect thereto, at least one of said members being provided with a vertical slot, a key engaging said slot, and a friction spring fixed to said key and having laterally-extending arms frictionally engaging the member to which said key is not attached, means for admitting fluid to said chamber to move said piston in one direction, and means associated with said casing for causing said clamping member to grip a work-piece received therein when said piston is moved in said direction by said fluid, said friction spring, key, and vertical slot in said member releasably maintaining said clamping member in any of its adjusted positions relative to said piston.

3. In a work holder, a casing providing a piston chamber and a tubular extension aligned therewith, a piston in said chamber, a collet in said extension threadedly connected to said piston for longitudinal adjustment with respect thereto, said collet having a longitudinal slot therein, means for admitting fluid to said chamber to move said piston in one direction, means associated with said casing for compressing said clamping member when said piston is moved in said direction, a key engaging said vertical slot in said collet, and a spring fixed to the outer surface of said key and having arm portions frictionally engaging the casing walls about said collet to normally resist rotation of said collet, said collet being rotatable against said resistance to adjust said collet vertically with respect to said piston.

4. In a work holder, a casing providing a piston chamber and a tubular bore vertically aligned therewith, a clamping ring carried by said casing above said tubular bore and having inwardly-tapered walls, a piston in said chamber, a collet in said tubular bore and having inwardly-tapered walls engaging the walls of said ring, said collet having slots therein to provide clamping jaws and having also a threaded connection with said piston to provide for vertical adjustment of said collet with respect to said piston, said collet being also provided with a vertical guide slot extending from a central portion of the collet down to the lower portion thereof, a key engaging said guide slot, and a friction spring fixed to the outer surface of said key and having arms engaging the casing about said collet normally to resist rotation of said collet with respect to said piston, and means for admitting pressure fluid to said chamber above said piston to move the same downwardly.

THEODORE E. MEAD.

REFERENCES CITED

The following references are of record in the file of this patent:

UNITED STATES PATENTS

| Number | Name | Date |
|---|---|---|
| 926,761 | Oliver | Sept. 6, 1909 |
| 1,085,146 | McClellan | Feb. 27, 1914 |
| 1,786,689 | White | Dec. 30, 1930 |
| 2,210,473 | Testa | Aug. 6, 1940 |
| 2,393,458 | Cook | Jan. 22, 1946 |
| 2,396,521 | Mead | Mar. 12, 1946 |
| 2,401,071 | Hillberg | May 28, 1946 |